(12) United States Patent
Seo

(10) Patent No.: US 8,488,254 B2
(45) Date of Patent: Jul. 16, 2013

(54) ZOOM LENS OPTICAL SYSTEM AND IMAGE PICKUP APPARATUS HAVING THE SAME

(75) Inventor: Jin-seon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/241,349

(22) Filed: Sep. 23, 2011

(65) Prior Publication Data

US 2012/0075718 A1   Mar. 29, 2012

(30) Foreign Application Priority Data

Sep. 27, 2010   (KR) .............................. 2010-0093279

(51) Int. Cl.
*G02B 15/14* (2006.01)
(52) U.S. Cl.
USPC ........... 359/687; 359/683; 359/684; 359/685; 359/715; 359/740; 359/774
(58) Field of Classification Search
USPC .................. 359/683–685, 687, 715, 740, 774
See application file for complete search history.

(56) References Cited

U.S. PATENT DOCUMENTS 7,652,827 B2    1/2010  Taguchi et al.
2006/0291072 A1*  12/2006  Hoshi ........................... 359/687

FOREIGN PATENT DOCUMENTS

| JP | 2005-181556 | 7/2005 |
| JP | 2006-30581 | 2/2006 |
| JP | 2007-178846 | 7/2007 |
| JP | 2008-216591 | 9/2008 |

* cited by examiner

*Primary Examiner* — Evelyn A. Lester
(74) *Attorney, Agent, or Firm* — Stanzione & Kim, LLP

(57) ABSTRACT

A zoom lens optical system includes a first lens unit having a positive refractive index, a second lens unit which is arranged behind the first lens unit and has a negative refractive index, a third lens unit which is arranged behind the second lens unit and has a positive refractive index, and a fourth lens unit which is arranged behind the third lens unit and has a positive refractive index. An aperture is arranged within the third lens unit to prevent reduction of shutter speed due to large diameter of the zoom lens optical system.

17 Claims, 13 Drawing Sheets

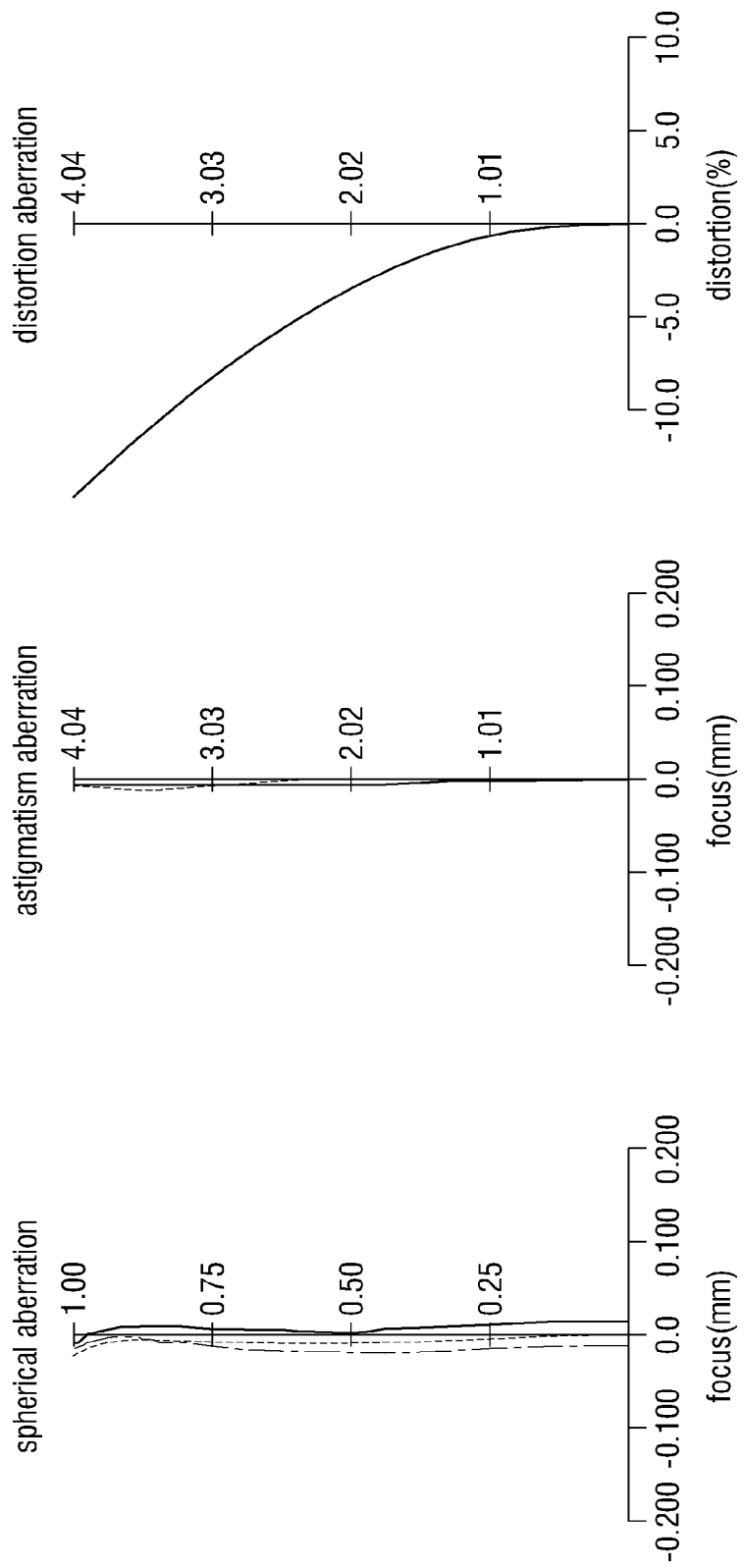

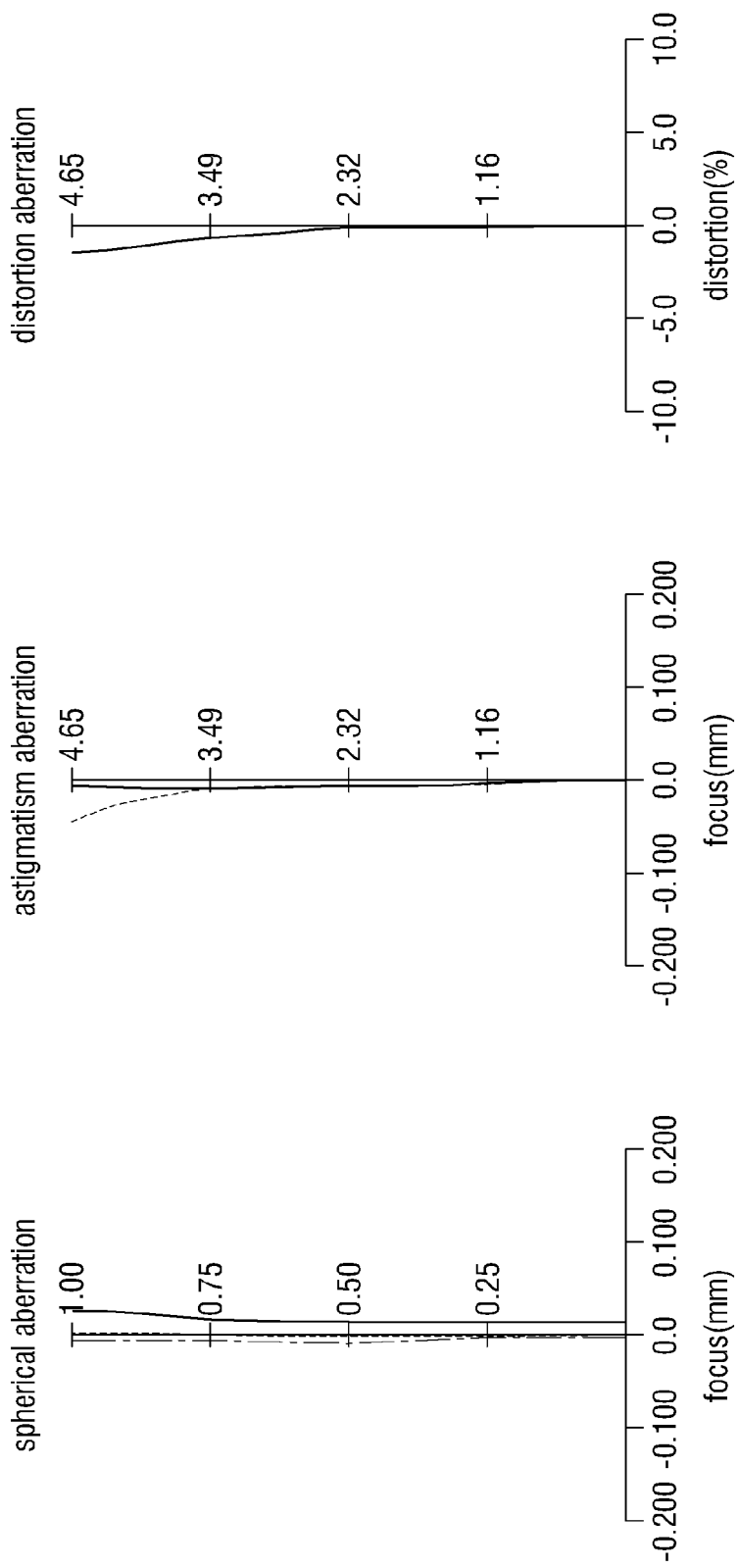

ZOOM LENS OPTICAL SYSTEM AND IMAGE PICKUP APPARATUS HAVING THE SAME

CROSS-REFERENCE TO RELATED APPLICATIONS

This application claims priority under 35 U.S.C. §119(a) from Korean Patent Application No. 10-2010-0093279 filed Sep. 27, 2010 in the Korean Intellectual Property Office, the disclosure of which is incorporated herein by reference in its entirety.

BACKGROUND OF THE INVENTION

1. Field of the Invention

The present general inventive concept relates to an image pickup apparatus. More particularly, the present general inventive concept relates to a zoom lens optical system usable in an image pickup apparatus.

2. Description of the Related Art

A zoom lens optical system is an optical system that can change a focal length to enlarge or reduce an image corresponding to an object. In order to achieve high zoom magnification and to reduce aberration that is generated in the zoom lens optical system, a plurality of lenses are combined and used in the zoom lens optical system. Accordingly, the zoom lens optical system is larger and heavier than a single focus optical system.

Recently image pickup apparatuses which use a zoom lens optical system, such as digital still cameras, video cameras, and the like, have been widely distributed and used. Therefore, for users' convenience, many efforts to develop more compact and more lightweight image pickup apparatuses have been made. Depending on to the trend, the zoom lens optical systems are required to be miniaturized and lightweight.

Also, for photographing under low illumination, it is preferable to provide a brighter optical system, that is, an optical system having a small F number. Therefore, it is a trend that the optical system of the image pickup apparatus has a large diameter. However, in this case since the size of an aperture thereof also becomes bigger, a shutter speed thereof becomes slower. Accordingly, technology is required to improve the shutter speed in the optical system of the image pickup apparatus which may have a large diameter.

SUMMARY OF THE INVENTION

The present general inventive concept provides a zoom lens optical system that can be miniaturized, have a lightweight, have a large diameter and improve a shutter speed, and an image pickup apparatus having the same.

Additional aspects and advantages of the present general inventive concept will be set forth in part in the description which follows and, in part, will be obvious from the description, or may be learned by practice of the general inventive concept.

The above and/or other aspects, features, and utilities of the present general inventive concept can substantially be achieved by providing a zoom lens optical system, which may include a first lens unit having a positive refractive index, a second lens unit which is arranged behind the first lens unit and has a negative refractive index, a third lens unit which is arranged behind the second lens unit and has a positive refractive index, and a fourth lens unit which is arranged behind the third lens unit and has a positive refractive index, wherein an aperture is arranged at a location where a principal ray has a minimum height from an optical axis within the third lens unit.

The third lens unit may include a sixth lens having a positive refractive index; a second doublet lens which is disposed between the sixth lens and the aperture and is formed by junction of a seventh lens having a positive refractive index and an eighth lens having a negative refractive index; and a third doublet lens which is disposed behind the aperture and is formed by junction of a ninth lens having a negative refractive index and a tenth lens having a positive refractive index.

The sixth lens may be an aspherical lens.

An object-side lens surface of the ninth lens may be aspheric.

The aperture may move with the third lens unit during zooming operation of the zoom lens optical system.

A focal length $f_t$ of the zoom lens optical system at a telephoto end, a focal length $f_w$ of the zoom lens optical system at a wide-angle end, and a focal length $f_2$ of the second lens unit may satisfy a formula of $$0.23 < \left| \frac{f_t/f_w}{f_2} \right| < 0.35.$$

A distance Lw between a first object side lens surface of the first lens unit and an image forming surface at a wide-angle end, a distance Lt between the first object side lens surface of the first lens unit and the image forming surface at a telephoto end, a focal length $f_w$ of the zoom lens optical system at the wide-angle end, and a focal length $f_t$ of the zoom lens optical system at the telephoto end may satisfy a formula of $$11.5 < (L_w/f_w) + (L_t/f_t) < 13.5$$

Abbe's number Vd of at least one lens of the second lens unit may satisfy a formula of $70 \leq Vd$.

While a focal length of the zoom lens optical system changes from a wide-angle end to a telephoto end, the first, second, third, and fourth lens units may move along the optical axis so that an interval between the first lens unit and the second lens unit is increased, an interval between the second lens unit and the third lens unit is decreased, and an interval between the third lens unit and the fourth lens unit is increased.

The first lens unit may include a first doublet lens formed by junction of a first lens having a negative refractive index and a second lens having a positive refractive index.

The second lens unit may include a third lens of meniscus type having a negative refractive index; a fourth lens which is arranged behind the third lens, has a negative refractive index, and is a biconcave lens; and a fifth lens which is arranged behind the fourth lens, has a negative refractive index and is a meniscus type lens.

At least one lens among the third, fourth, and fifth lenses may include an aspherical lens.

The fourth lens unit may include an eleventh lens having a positive refractive index.

The eleventh lens may include an aspherical lens.

The first lens unit may include a twelfth lens which is arranged behind the first doublet lens and has a positive refractive index.

An F number of the zoom lens optical system may be 1.2 at a wide-angle end.

The above and/or other aspects, features, and utilities of the present general inventive concept can also substantially be achieved by providing an image pickup apparatus may include a zoom lens optical system as described above.

BRIEF DESCRIPTION OF THE DRAWINGS

These and/or other aspects and advantages of the present disclosure will become apparent and more readily appreciated from the following description of the embodiments, taken in conjunction with the accompanying drawings of which:

FIGS. 4A, 4B, and 4C are graphs illustrating aberration characteristics of a zoom lens optical system according to an embodiment of the present disclosure;

FIGS. 6A, 6B, and 6C are graphs illustrating aberration characteristics of the zoom lens optical system illustrated in FIG. 5;

DETAILED DESCRIPTION OF THE PREFERRED EMBODIMENTS

Figure 1:
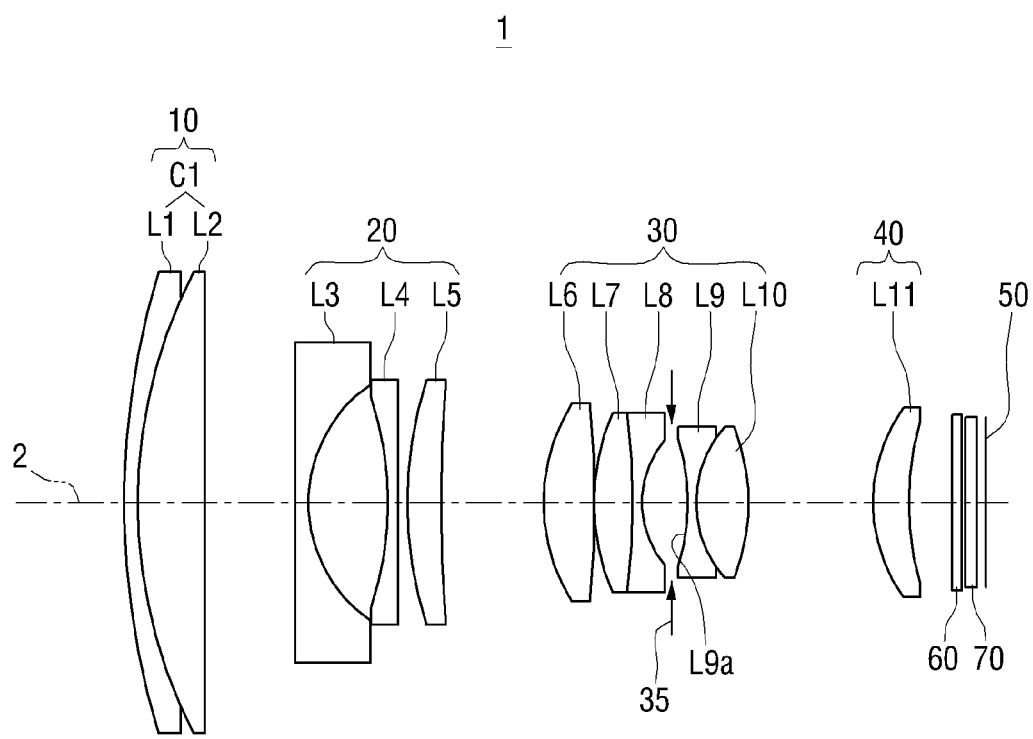
FIG. 1 is a view schematically illustrating a zoom lens optical system according to an embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
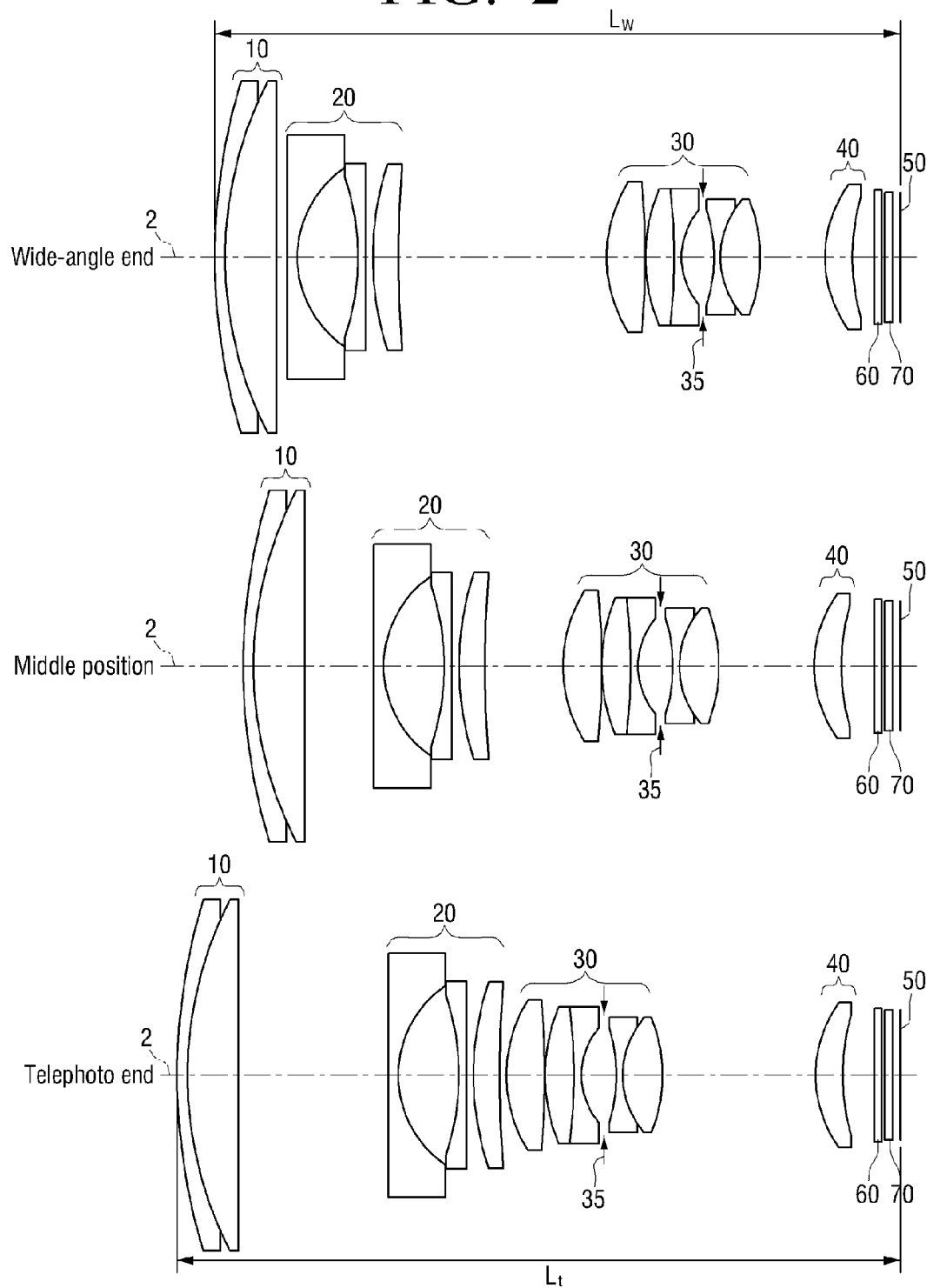
FIG. 2 is a view schematically illustrating a zooming operation of the zoom lens optical system illustrated in FIG. 1.

FIG. 1 is a view schematically illustrating a zoom lens optical system 1 according to an embodiment of the present disclosure, and FIG. 2 is a view schematically illustrating a zooming operation of the zoom lens optical system illustrated in FIG. 1.

As illustrated in FIG. 1, first, second, third and fourth lens units are arranged on an optical axis 2. An object that is not illustrated in FIG. 1 is placed at the left side of the first lens unit 10 and an image forming surface 50 is placed at the right side of the fourth lens unit 40. Light from the object passes through the first, second, third and fourth lens units 10, 20, 30 and 40 and forms an image of the object on the image forming surface 50.

Hereinafter, terms that represent a relative location between components of the zoom lens optical system 1 based on a direction from the object which is placed in the left side of FIG. 1 to the image forming surface 50 which is placed in the right side of FIG. 1 will be used. For example, that a first component is "in front of" a second component means that the first component is closer to the object than the second component. That the first component is "behind" the second component means that the first component is closer to the image forming surface 50 than the second component.

The first lens unit 10 is a lens unit that is closest to the object and has a positive refractive index. The first lens unit 10 may include a first doublet lens C1 which a first lens L1 having a negative refractive index and a second lens L2 having a positive refractive index. The first lens L1 and the second lens L2 may be attached to each other to form the first doublet lens C1 of the first lens unit 10. If the first lens unit 10 is constituted of one lens, it may not be easy to reduce chromatic aberration which is generated in the first lens unit 10. If the first lens unit 10 is constituted of three lenses or more, the size and weight of the zoom lens optical system 1 may be increased. Accordingly, the first doublet lens C1 which is formed by junction of two lenses L1 and L2 is used as the first lens unit 10, both reduction of chromatic aberration and miniaturization of the zoom lens optical system 1 may be accomplished. If the first lens L1 has a large dispersion value, it is possible to further reduce the chromatic aberration.

The second lens unit 20 is arranged behind the first lens unit 10 and has a negative refractive index. The second lens unit 20 may include a third lens L3, a fourth lens L4 which is arranged behind the third lens L3, and a fifth lens L5 which is arranged behind the fourth lens L4. The third lens L3 may have a negative refractive index and may be a meniscus type lens. The fourth lens L4 may have a negative refractive index and may be a biconcave lens. The fifth lens L5 may have a positive refractive index and may be a meniscus type lens. In order to reduce chromatic aberration, the third and fourth lenses L3 and L4 may have a low dispersion value and the fifth lens L5 may have a large dispersion value. In order to reduce spherical aberration, at least one lens among the third, fourth and fifth lenses L3, L4 and L5 may be an aspherical lens. The third and fifth lenses L3 and L5 may be designed to be an aspherical lens, respectively, as an example of the present general inventive concept.

The third lens unit 30 is arranged behind the second lens unit 20 and has a positive refractive index. The third lens unit 30 may include a sixth lens L6, a second doublet lens C2 which is arranged behind the sixth lens L6, and a third doublet lens C3 which is arranged behind the second doublet lens C2. The sixth lens L6 has a positive refractive index. In order to reduce the spherical aberration, the sixth lens L6 may be an aspherical lens. The second doublet lens C2 may be formed by junction of a seventh lens L7 having a positive refractive index and an eighth lens L8 having a negative refractive index. Any one lens L7 of the second doublet lens C2 may have a large dispersion value and the other lens L8 may have a low dispersion value, thereby reducing chromatic aberration which occurs during zooming operation. The third doublet lens C3 may be formed by junction of a ninth lens L9 having a negative refractive index and a tenth lens L10 having a positive refractive index. According to an embodiment of the present general inventive concept, two doublet lenses C2 and C3 are used in the third lens unit 30, and thus the chromatic aberration may be reduced.

According to an embodiment of the present general inventive concept, an aperture 35 may be disposed within the third lens unit 30. The aperture 35 may be arranged at a location where a principal ray has a minimum height from an optical axis 2 within the third lens unit 30. In an embodiment of the present disclosure, the location is between the second and third doublet lenses C2 and C3. In other words, in the third lens unit 30, the sixth lens L6 and the second doublet lens C2 are arranged in front of the aperture 35 and the third doublet lens C3 is arranged behind the aperture 35. Since the aperture 35 is arranged at the location where the principal ray has the minimum height, the size of the aperture 35 may be minimized. Therefore, when the zoom lens optical system 1 has a large diameter, the shutter speed may not be increased due to minimization of the size of the aperture 35. As illustrated in FIG. 2, the aperture 35 is moved together with the third lens unit 30 while the zoom lens optical system 1 performs a zooming operation.

An object-side lens surface L9a of the ninth lens L9 which is directly behind the aperture 35 may be aspheric. Due to this astigmatism aberration generated when correcting hand tremors may be effectively corrected.

The fourth lens unit 40 is disposed behind the third lens unit 30, and has a positive refractive index. The fourth lens unit 40 may include an eleventh lens L11 having a positive refractive index. The eleventh lens L11 may correct distortion aberration and curvature of image field. Since the fourth lens unit 40 has a positive refractive index, telecentric effect in which a light incident to a circumference of the image forming surface 50 enters almost perpendicularly to the image forming surface 50 may be achieved. In order to reduce spherical aberration, the fourth lens unit 40 may be an aspherical lens.

An optical filter 60 and a cover glass 70 may be disposed in front of the image forming surface 50. The optical filter 60 can filter light having undesirable wavelength ranges. For example, the optical filter 60 may be an infrared light cut filter to block infrared light. The cover glass 70 is disposed directly in front of the image forming surface 50 and protects the image onto the image forming surface 50.

Referring to FIG. 2, a zooming operation of the zoom lens optical system 1 will be explained, hereinafter. In FIG. 2, the zoom lens optical system 1 illustrates a wide-angle end, a telephoto end, and a middle position between the wide-angle end and the telephoto end as the zooming operation.

According to an embodiment of the present disclosure, the first, second, third, and fourth lens units 10, 20, 30 and 40 can move along the optical axis 2. As illustrated in FIG. 2, when the zoom lens optical system 1 is changed from the wide-angle end to the telephoto end, a focal length of the zoom lens optical system 1 is changed such that the first, second, third, and fourth lens units 10, 20, 30 and 40 move to increase an interval between the first lens unit 10 and the second lens unit 20, to decrease an interval between the second lens unit 20 and the third lens unit 30, and to increase the interval between the third lens unit 30 and the fourth lens unit 40. When the zoom lens optical system 1 is changed from the telephoto end to the wide-angle end, the focal length of the zoom lens optical system 1 is changed such that the first, second, third, and fourth lens units 10, 20, 30 and 40 move reversely to that described above. In FIG. 2, the fourth lens unit 40 may move with respect to the first, second, or third lens unit 10, 20, or 30, or the image forming surface 50. However, a movement of the fourth lens unit 40 is very small compared to the movement of the first, second or third lens unit 10, 20 or 30 with respect to the image forming surface 50. Compared to a zoom lens optical system in which some of lens units are fixed and the other lens units move with respect to the fixed lens units, in the zoom lens optical system 1 according to an embodiment of the present disclosure, since all the lens units 10, 20, 30 and 40 move for a zooming operation, high zoom magnification can be achieved and the zoom lens optical system 1 can be miniaturized.

The middle position may be an initial position of the zoom lens optical system 1. The initial position may be referred to as a state when the zoom lens optical system 1 is not activated or operable, or when an apparatus having the zoom lens optical system 1 is turned off. It is also possible that the initial position may be a position where the first, second, third and fourth lens units 10, 20, 30 and 40 are disposed close to one another.

The zoom lens optical system 1 according to an embodiment of the present general inventive concept may satisfy the following Formula 1.

$$0.23 < \left| \frac{f_t / f_w}{f_2} \right| < 0.35 \qquad \text{<Formula 1>}$$

where $f_t$ presents the focal length of the zoom lens optical system 1 at the telephoto end, $f_w$ presents the focal length of the zoom lens optical system 1 at the wide-angle end, and $f_2$ presents the focal length of the second lens unit 20.

Formula 1 relates to a variable magnification ratio of the zoom lens optical system 1 with respect to the focal length $f_2$ the second lens unit 20. When refraction of the second lens unit 20 becomes too weak so that the variable magnification ratio is below the lower limit of Formula 1, during a zooming operation, a moving amount of the second lens unit 20 is increased. As a result, a total length of the zoom lens optical system 1 is increased, thereby hindering miniaturization of the zoom lens optical system 1. When the variable magnification ratio is higher than the upper limit of Formula 1, total magnification of the zoom lens optical system 1 becomes too large or the refraction of the second lens unit 20 becomes too strong so that aberration correction and stable zooming operation become difficult.

The zoom lens optical system 1 according to an embodiment of the present general inventive concept may also satisfy the following formula 2.

$$11.5 < (L_w/f_w) + (L_t/f_t) < 13.5 \qquad \text{<Formula 2>}$$

where Lw presents a distance between a first object side lens surface of the first lens unit 10 and the image forming surface 50 at the wide-angle end, and Lt presents a distance between the first object side lens surface of the first lens unit 10 and the image forming surface 50 at the telephoto end (see FIG. 2).

Formula 2 relates to a ratio of an entire length of the zoom lens optical system 1 with respect to the focal length at each of the wide-angle end and the telephoto end. Since refractions of the second lens unit 20 and the third lens unit 30 are too strong so that the ration is below the lower limit of Formula 2, it is not easy to correct spherical aberration and magnification chromatic aberration. Since the entire length of the zoom lens optical system 1 is increased as compared to the focal length above the upper limit of Formula 2, miniaturization of the zoom lens optical system 1 is hindered.

The zoom lens optical system 1 according to an embodiment of the present general inventive concept may also satisfy the following formula 3

$$70 \leq Vd \qquad \text{<Formula 3>}$$

where Vd presents Abbe's number of any one lens of the second lens unit 20.

Formula 3 relates to Abbe's number. When the Abbe number is below the lower limit of Formula 3, correction of chromatic aberration becomes difficult. In an embodiment of the present general inventive concept, the fourth lens L4 between the third lens L3 and the fifth lens L5 is designed to have Abbe's number to satisfy Formula 3.

Tables 1 to 4 provide numerical data of the zoom lens optical system 1 according to an embodiment of the present general inventive concept.

Table 1 provides detailed data of the surfaces which are on an optical path in an embodiment of the present disclosure. In Table 1, surface numbers represent in sequential order the surfaces which are located on the optical path along a direction from the object toward the image forming surface 50. The surface number which is indicated as "sto" represents the aperture 35. The surface numbers of 1-14 and 16-20 represent lens surfaces of the first to eleventh lenses L1-L11. The surface numbers of 21 and 22 represent surfaces of the optical filter 60. The surface numbers of 23 and 24 represent surfaces of the cover glass 70.

TABLE 1

| Surface number | Radius of curvature | Surface interval | Refractive index (Nd) | Abbe's number (Vd) |
|---|---|---|---|---|
| 1 | 46.179 | 0.7 | 2.00272 | 19.32 |
| 2 | 28.942 | 3.585 | 1.91082 | 35.25 |
| 3 | 500 | Variable (D1) | | |
| 4* | 240.007 | 0.7 | 1.85066 | 40.43 |
| 5* | 7.594 | 4.501 | | |
| 6 | −21.19 | 0.5 | 1.48749 | 70.44 |
| 7 | 300 | 0.567 | | |
| 8* | 19.56 | 1.732 | 2.09884 | 16.75 |
| 9* | 40.71 | Variable (D2) | | |
| 10* | 9.375 | 2.774 | 1.8047 | 40.95 |
| 11* | −49.53 | 0.1 | | |
| 12 | 12.719 | 2.202 | 1.8042 | 46.5 |
| 13 | −30.702 | 0.35 | 1.76182 | 26.61 |
| 14 | 5.799 | 1.5 | | |
| sto | Infinity | 0.893 | | |
| 16* | −16.832 | 0.5 | 1.68893 | 31.16 |
| 17 | 6.645 | 3.014 | 1.7725 | 49.62 |
| 18 | −10.845 | Variable (D3) | | |
| 19* | 11.663 | 1.742 | 1.85135 | 40.1 |
| 20* | 21.819 | Variable (D4) | | |
| 21 | Infinity | 0.3 | 1.5168 | 64.2 |
| 22 | Infinity | 0.3 | | |
| 23 | Infinity | 0.5 | 1.5168 | 64.2 |
| 24 | Infinity | Variable (D5) | | |
| Image forming surface | Infinity | Variable (D6) | | |

In Table 1, a mark of "*" which is added behind some of the surface numbers means that the surface corresponding to the surface number is aspheric.

Table 2 provides data relating with the aspheric as described above. A formula that is used to represent aspheric is as follows.

$$x = \frac{c' y^2}{1 + \sqrt{1 - (K+1)c'^2 y^2}} + Ay^4 + By^6 + Cy^8 + Dy^{10}$$

wherein x represents a distance from a peak point of the lens in a direction toward the optical axis, y represents a distance in a direction perpendicular to the optical axis, c' represents a reciprocal of radius of curvature at the peak point of the lens, K represents a conic constant, and A, B, C and D represent aspherical coefficients.

TABLE 2

| Surface number | K | A | B | C | D |
|---|---|---|---|---|---|
| 4 | −1 | −4.03780E−5 | 8.60700E−7 | −8.74924E−9 | 3.09381E−11 |
| 5 | −0.331132 | −7.53700E−5 | 5.36579E−7 | 1.17898E−8 | |
| 8 | −0.34953 | −5.47999E−5 | −7.47755E−7 | | |
| 9 | −5.098141 | −3.99757E−5 | −9.57936E−7 | −2.10224E−9 | |
| 10 | −0.272212 | −8.04629E−5 | 5.21057E−7 | −4.57614E−9 | |
| 11 | −29.881718 | 1.12015E−4 | −6.87962E−8 | −9.30535E−9 | 8.36742E−11 |
| 16 | 0.361971 | −2.43152E−4 | −8.73983E−6 | −1.03646E−8 | |
| 19 | 1.332029 | 1.73582E−4 | −3.21943E−6 | | |
| 20 | −1 | 3.51212E−4 | −6.15455E−6 | | |

Table 3 provides data relating with surface intervals which are changed corresponding to the zooming operation of the zoom lens optical system 1.

TABLE 3

| | Wide-angle end | Middle position | Telephoto end |
|---|---|---|---|
| D1 | 0.861 | 5.083 | 11.023 |
| D2 | 15.237 | 5.748 | 0.7 |
| D3 | 4.731 | 7.043 | 11.271 |
| D4 | 1.886 | 2.645 | 2.517 |
| D5 | 0.6 | 0.6 | 0.6 |
| D6 | −0.005 | −0.005 | 0.024 |

Table 4 provides an effective focal length EFL, an F number and an angle of view ω of the zoom lens optical system 1 according to an embodiment of the present disclosure in each of zooming positions.

TABLE 4

| | EFL | F number | ω/2 |
|---|---|---|---|
| Wide-angle end | 5.15 | 1.2 | 42.06 |
| Middle position | 8.76 | 1.8 | 29.19 |
| Telephoto end | 14.68 | 2.4 | 17.75 |

In an embodiment of the present disclosure, numerical values corresponding to Formulas 1, 2 and 3 are as follow.

$|(f_t/f_w)/f_2|$: 0.28

$(L_w/f_w)+(L_t/f_t)$: 13.24

Vd: 70.44

Therefore, this embodiment satisfies all of Formulas 1, 2 and 3.

As shown in Table 4, since F number is 1.2 and the angle of view is 80 degrees or more, the zoom lens optical system 1 can have a large diameter and a wide angle. Also, as described above, since the aperture 35 is disposed within the third lens unit 30, the shutter speed can be prevented from being reduced due to increasing of the diameter of lens of the lens optical system 1.

Figure 3A:
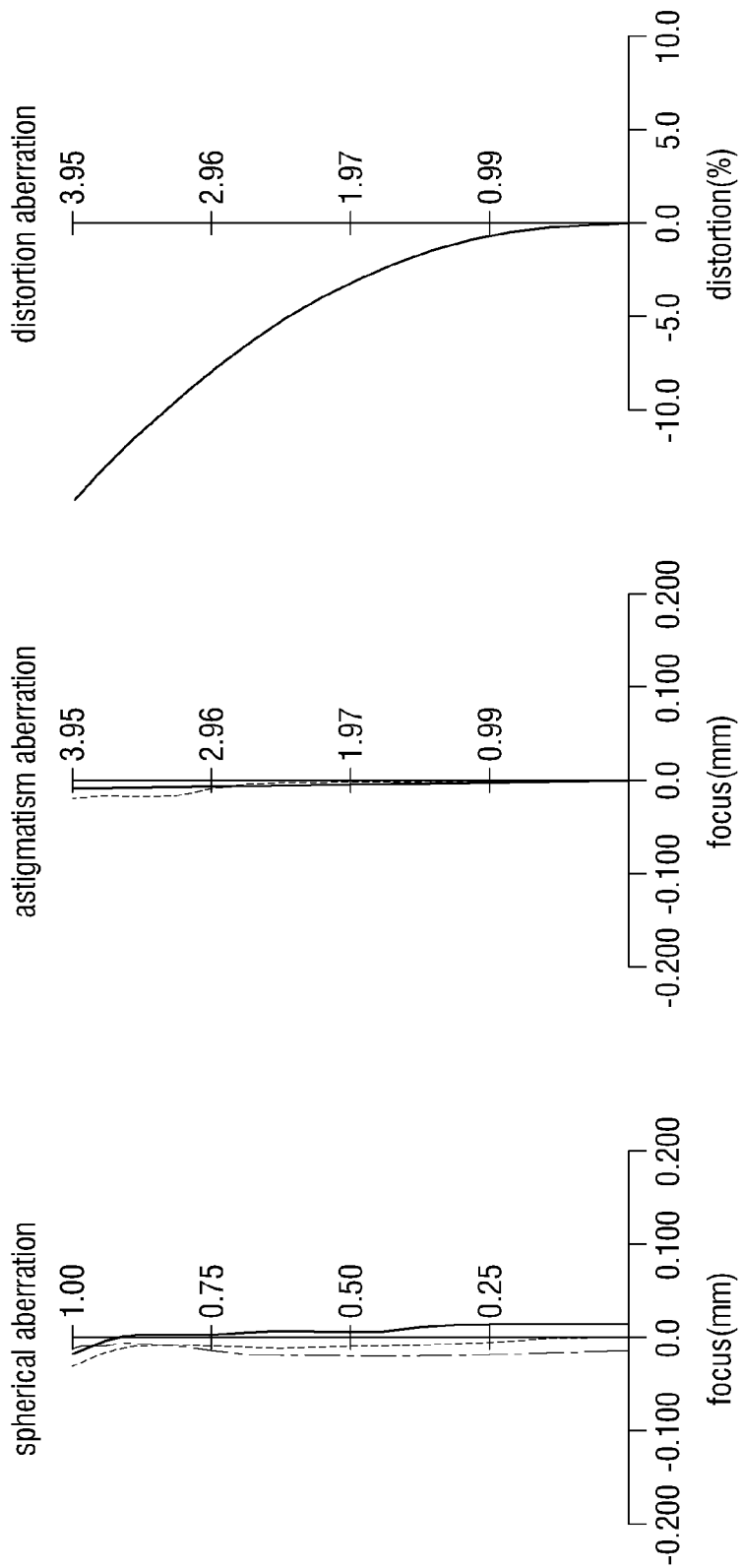
FIGS. 3A, 3B, and 3C are graphs illustrating aberration characteristics of the zoom lens optical system illustrated in FIG. 1.
Figure 3B:
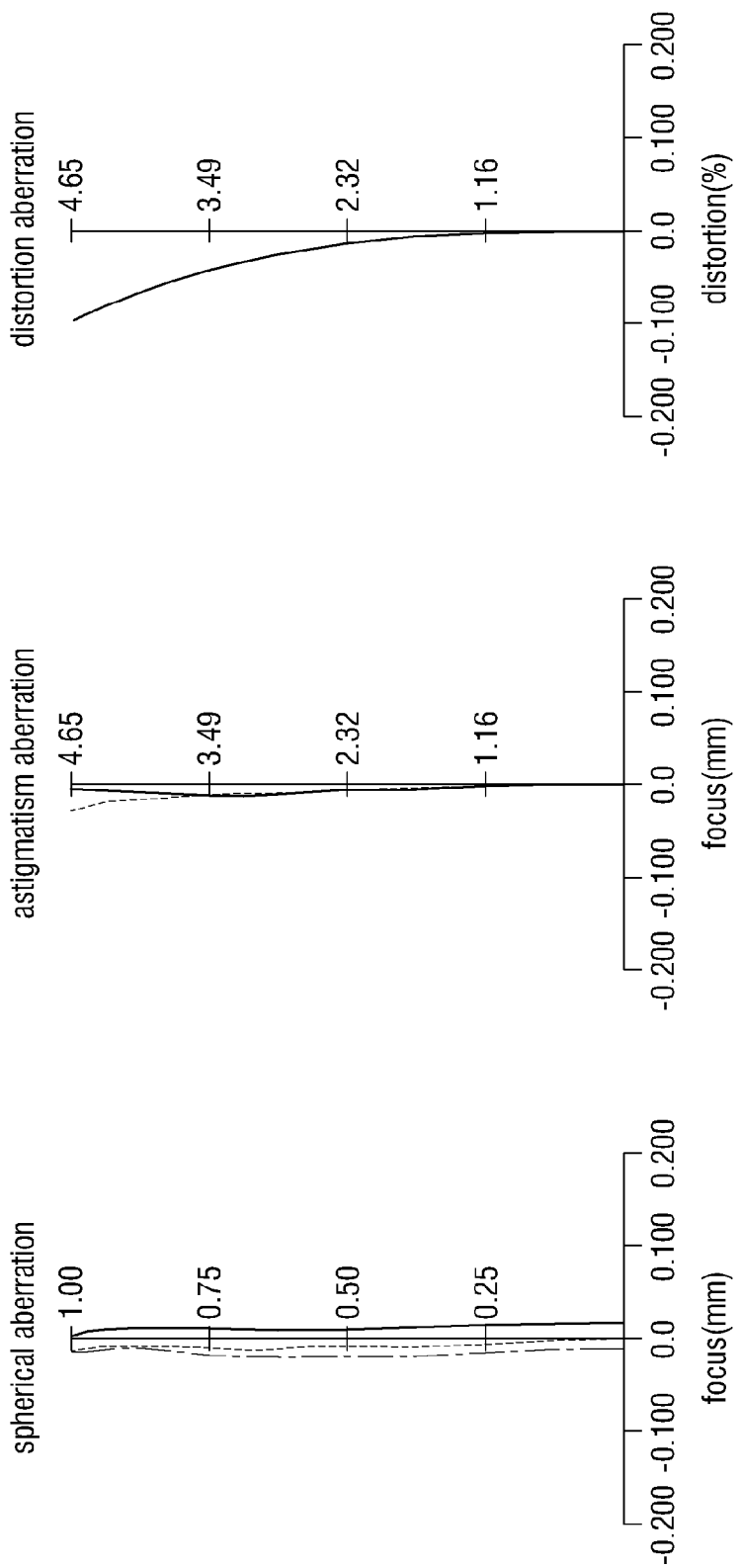
Figure 3C:
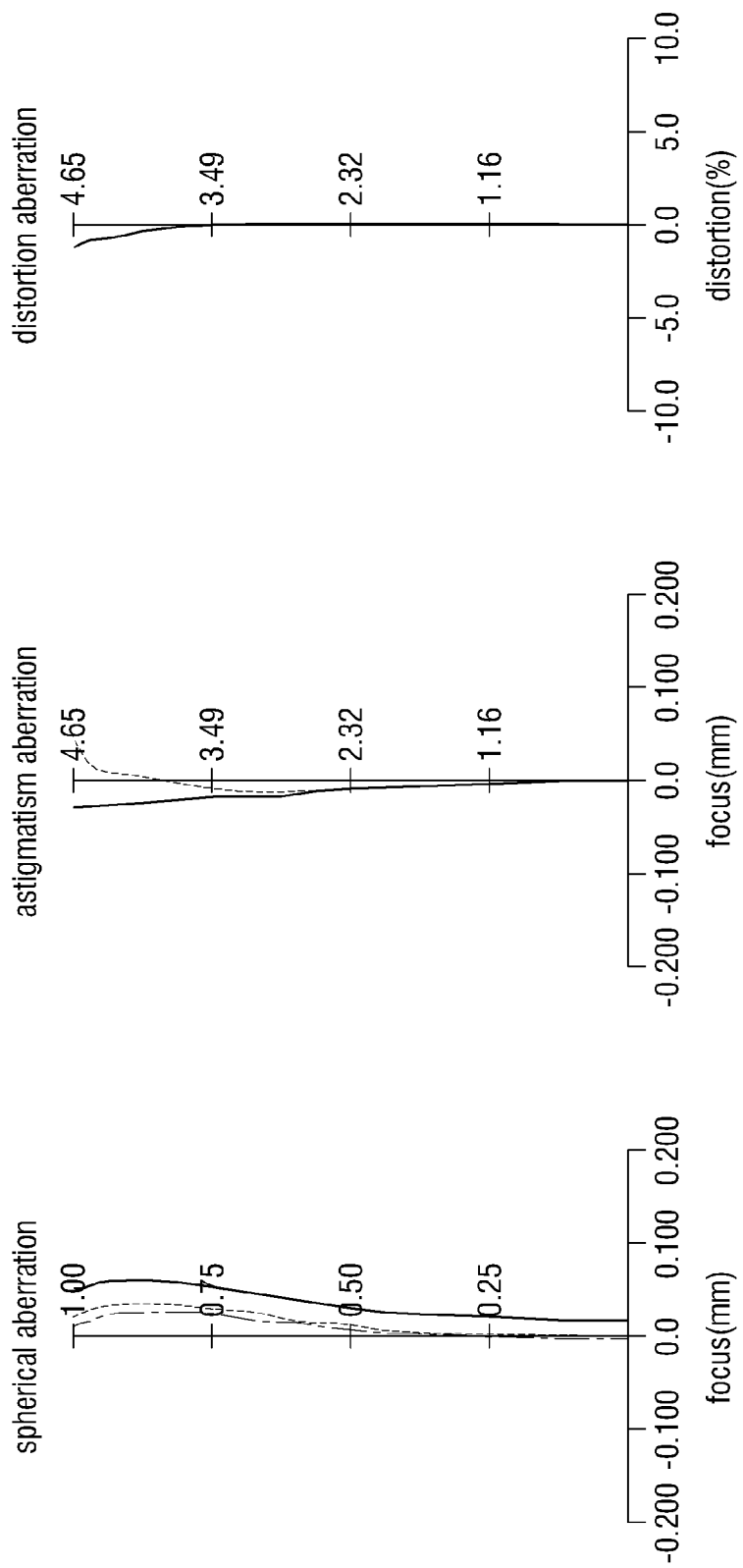

FIGS. 3A, 3B, and 3C are graphs which represent aberration characteristics of the zoom lens optical system 1 according to an embodiment of the present general inventive concept. FIG. 3A represents the aberration characteristics thereof at the wide-angle end. FIG. 3B represents the aberration characteristics thereof at the middle position. FIG. 3C represents the aberration characteristics thereof at the telephoto end. In the graphs showing spherical aberration, a solid line represents a light having a wavelength of 656.28 nm, a dotted line represents a light having a wavelength of 587.56 nm, and a dashed-dotted line represents a light having a wavelength of 486.13 nm. In the graphs showing astigmatism aberration, a solid line represents aberration in a tangential direction, and a dotted line represents aberration in a sagittal direction. As shown in FIGS. 3A, 3B, and 3C, all of the spherical aberration, astigmatism aberration, and distortion aberration are within an acceptable range.

Hereinafter, a zoom lens optical system according to another embodiment of the present disclosure will be explained. The zoom lens optical system according to this embodiment has a configuration similar to that of the zoom lens optical system 1 as illustrated in FIG. 1, but it has slightly different specific numerical data.

Tables 5 to 8 provide numerical data of the zoom lens optical system according to another embodiment of the present general inventive concept.

Table 5 provides detailed data of the surfaces which are on an optical path in an embodiment of the present disclosure.

TABLE 5

| Surface number | Radius of curvature | Surface interval | Refractive index (Nd) | Abbe's number (Vd) |
| --- | --- | --- | --- | --- |
| 1 | 48.778 | 0.7 | 2.00272 | 19.32 |
| 2 | 27.627 | 3.804 | 1.91082 | 35.25 |
| 3 | Infinity | Variable (D1) | | |
| 4* | 279.832 | 0.7 | 1.85135 | 40.1 |
| 5* | 8 | 4.419 | | |
| 6 | −17.865 | 0.5 | 1.48749 | 70.44 |
| 7 | 33.893 | 0.5 | | |
| 8* | 16.77 | 1.881 | 2.00178 | 19.32 |
| 9* | 52.572 | Variable (D2) | | |
| 10* | 10.087 | 3.021 | 1.80182 | 46.71 |
| 11* | −50.831 | 0.1 | | |
| 12 | 10.914 | 2.3 | 1.8042 | 46.5 |
| 13 | −50 | 0.35 | 1.76182 | 26.61 |
| 14 | 5.955 | 1.5 | | |
| sto | Infinity | 0.954 | | |
| 16* | −14.952 | 0.5 | 1.68893 | 31.16 |
| 17 | 7.518 | 2.945 | 1.7725 | 49.62 |
| 18 | −10.704 | Variable (D3) | | |
| 19* | 11 | 1.842 | 1.76802 | 49.24 |
| 20* | 21.693 | Variable (D4) | | |
| 21 | Infinity | 0.3 | 1.5168 | 64.2 |
| 22 | Infinity | 0.3 | | |
| 23 | Infinity | 0.5 | 1.5168 | 64.2 |
| 24 | Infinity | Variable (D5) | | |
| Image forming surface | Infinity | Variable (D6) | | |

In Table 5, a mark of "*" which is added behind some of the surface numbers means that the surface corresponding to the surface number is aspheric. Table 6 provides data relating to the above-described aspheric.

TABLE 6

| Surface number | K | A | B | C | D |
| --- | --- | --- | --- | --- | --- |
| 4 | −1 | −4.21449E−5 | 1.31079E−6 | −1.43610E−8 | 5.39170E−11 |
| 5 | −0.078611 | −1.31693E−4 | 5.43423E−7 | 5.31644E−9 | |
| 8 | 0.553358 | −7.23172E−5 | −5.48425E−7 | | |
| 9 | 6.963384 | −1.63105E−5 | −6.11432E−7 | −3.89687E−9 | |
| 10 | −0.161661 | −7.52129E−5 | 8.99974E−7 | −6.46305E−9 | |
| 11 | −11.384676 | 1.03903E−4 | 7.40714E−7 | −1.77027E−8 | 4.42512E−11 |
| 16 | 1.629933 | −2.60367E−4 | −7.94256E−6 | −7.19785E−8 | |
| 19 | −1.906898 | 4.04856E−4 | −2.90833E−6 | | |
| 20 | −1 | 2.52105E−4 | −8.54981E−6 | | |

Table 7 provides data of surface intervals which are changed corresponding to the zooming operation of the zoom lens optical system.

TABLE 7

| | Wide-angle end | Middle position | Telephoto end |
| --- | --- | --- | --- |
| D1 | 0.821 | 4.981 | 13.692 |
| D2 | 13.169 | 4.501 | 0.774 |
| D3 | 4.356 | 6.663 | 10.274 |
| D4 | 2.008 | 2.956 | 2.515 |
| D5 | 0.607 | 0.608 | 0.609 |
| D6 | −0.004 | 0 | 0.028 |

Table 8 provides an effective focal length EFL, an F number and an angle of view ω of the zoom lens optical system according to an embodiment of the present disclosure in each of zooming positions.

TABLE 8

| | EFL | F number | ω/2 |
| --- | --- | --- | --- |
| Wide-angle end | 5.47 | 1.2 | 40.90 |
| Middle position | 9.31 | 1.8 | 27.86 |
| Telephoto end | 15.60 | 2.3 | 16.43 |

In this embodiment, numerical values corresponding to Formulas 1, 2 and 3 are as follows.

$|(f_t/f_w)/f_2|$: 0.29

$(L_w/f_w)+(L_t/f_t)$: 12.3

Vd: 70.44

Therefore, this embodiment satisfies all of Formulas 1, 2 and 3.

As shown in Table 8, when the F number is 1.2 and the angle of view is 80 degrees or more at the wide angle end, the zoom lens optical system 1 can have a large diameter and a wide angle.

Figure 4B:
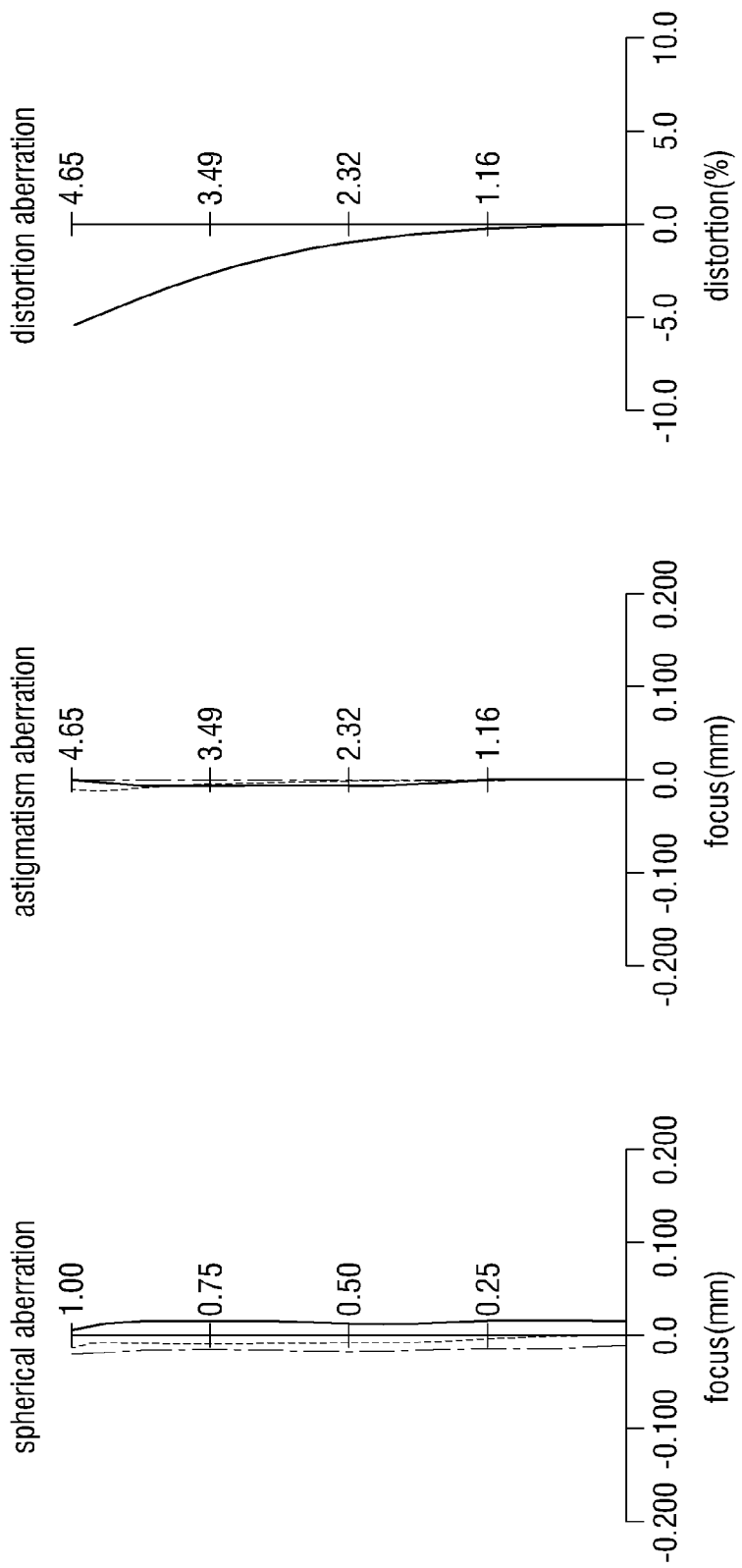
Figure 4C:
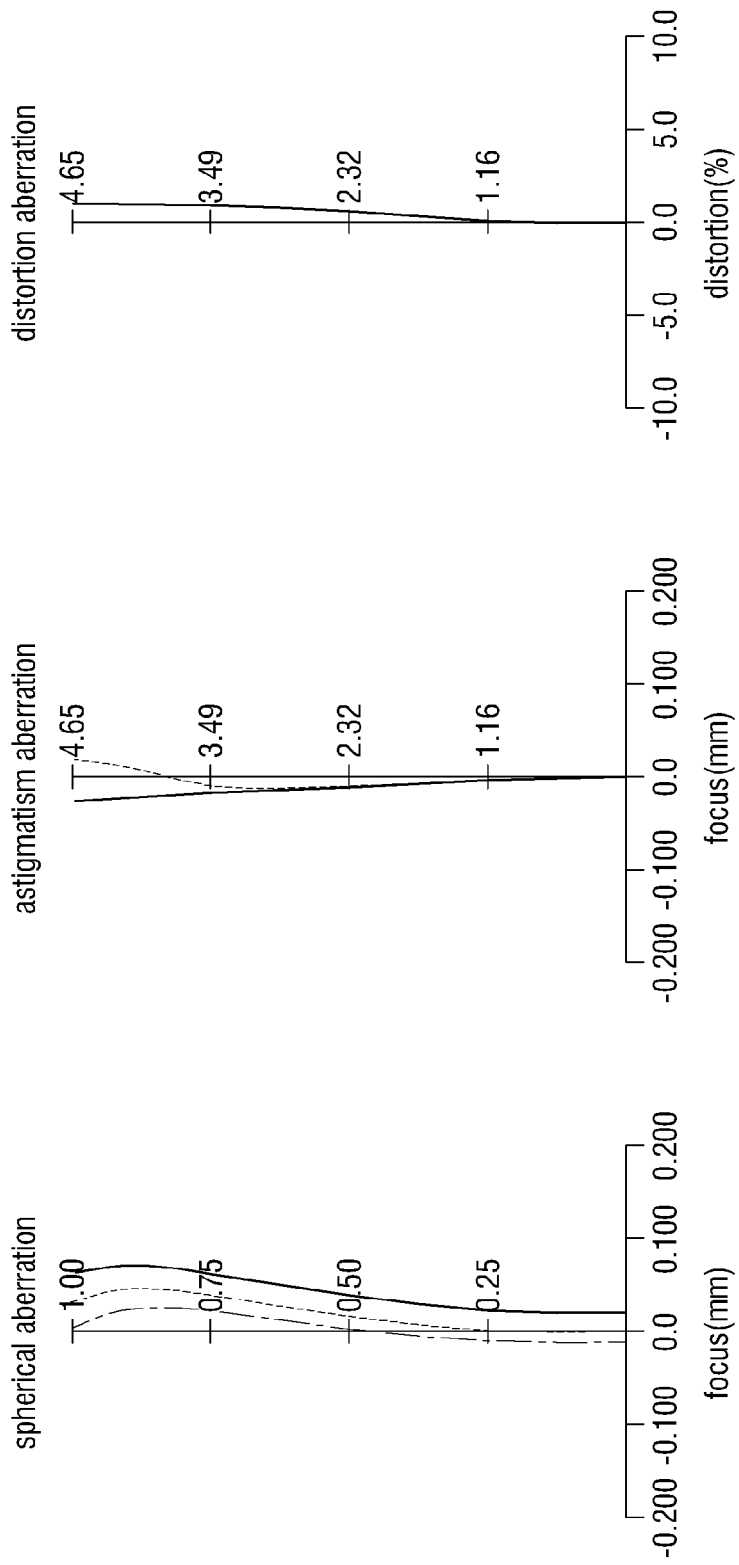

FIGS. 4A, 4B, and 4C are graphs which show aberration characteristics of the zoom lens optical system according to this embodiment. FIG. 4A shows the aberration characteristics thereof at the wide-angle end. FIG. 4B shows the aberration characteristics thereof at the middle position. FIG. 4C represents the aberration characteristics thereof at the telephoto end. In the graphs showing spherical aberration, a solid line represents a light having a wavelength of 656.28 nm, a dotted line represents a light having a wavelength of 587.56 nm, and a dashed-dotted line represents a light having a wavelength of 486.13 nm. In the graphs showing astigmatism aberration, a solid line represents aberration in a tangential direction, and a dotted line represents aberration in a sagittal direction. As shown in FIGS. 4A, 4B, and 4C, all of the spherical aberration, astigmatism aberration, and distortion aberration are within an acceptable range.

Figure 5:
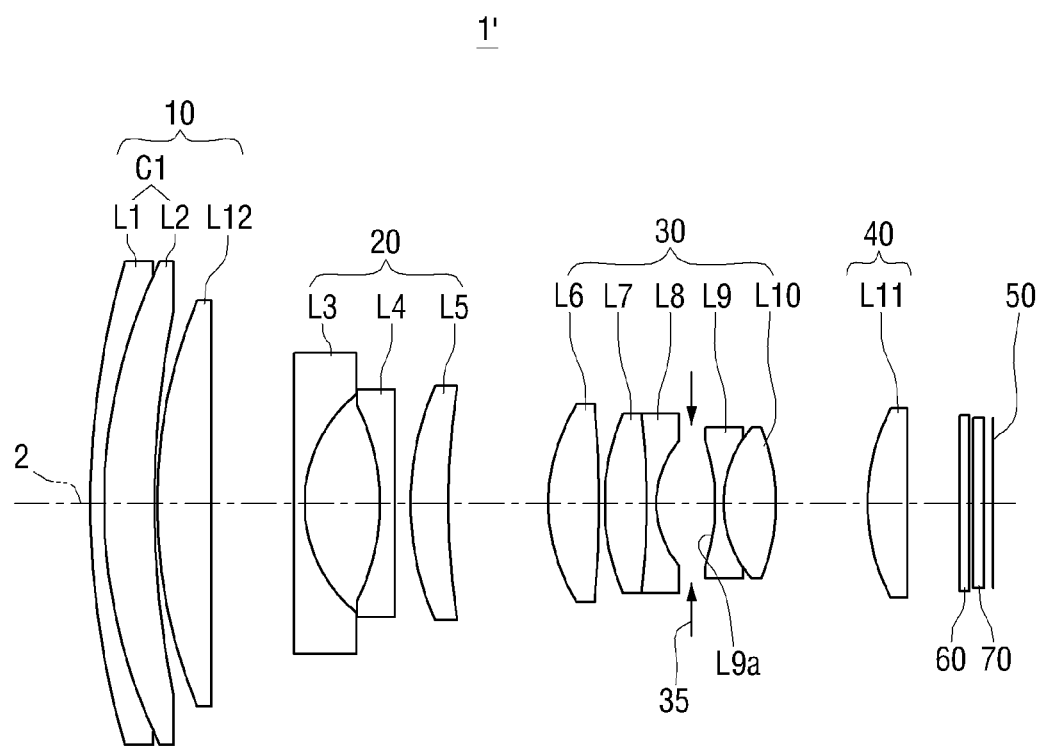
FIG. 5 is a view schematically illustrating a zoom lens optical system according to an embodiment of the present disclosure.

FIG. 5 is a view schematically illustrating a zoom lens optical system 1' according to another embodiment of the present general inventive concept. With respect to components identical to those of above-described embodiment, like reference numerals are assigned and detailed explanations thereof are omitted.

Difference between this embodiment and the embodiment illustrated in FIG. 1 is that a first lens unit 10 further includes a twelfth lens L12 having a positive refractive index. The twelfth lens L12 is disposed behind the first doublet lens C1. If the twelfth lens L12 is added in the first lens unit 10, it is possible that the size and weight of the zoom lens optical system 1' may be increased. However, the chromatic aberration thereof can be reduced further compared to the first lens unit 10 of FIG. 1.

Tables 9 to 12 provide numerical data of the zoom lens optical system 1' according to another embodiment of the present general inventive concept.

Table 9 provides detailed data of the surfaces which are on an optical path in this embodiment. The surface number which is indicated as "sto" represents the aperture 35. The surface numbers of 1-16 and 18-22 represent lens surfaces of the first to twelfth lenses L1-L12. The surface numbers of 23 and 24 represent surfaces of the optical filter 60. The surface numbers of 25 and 26 represent surfaces of the cover glass 70.

TABLE 9

| Surface number | Radius of curvature | Surface interval | Refractive index (Nd) | Abbe's number (Vd) |
|---|---|---|---|---|
| 1 | 48.608 | 0.7 | 2.00272 | 19.32 |
| 2 | 30 | 3.069 | 1.883 | 40.8 |
| 3 | 87.583 | 0.1 | | |
| 4 | 35 | 2.785 | 1.8042 | 46.5 |
| 5 | 200 | Variable (D1) | | |
| 6* | 295.698 | 0.7 | 1.83441 | 37.28 |
| 7* | 7.895 | 4.393 | | |
| 8 | −15.287 | 0.5 | 1.48749 | 70.44 |
| * | 46.41 | 1.231 | | |
| 10* | 18.797 | 2.127 | 2.00178 | 19.32 |
| 11* | 67.205 | Variable (D2) | | |
| 12* | 10.113 | 3.001 | 1.76802 | 49.24 |
| 13* | −52.791 | 0.258 | | |
| 14 | 11.726 | 2.726 | 1.8042 | 46.5 |
| 15 | −50 | 0.35 | 1.76182 | 26.61 |
| 16 | 5.877 | 1.7 | | |
| sto | Infinity | 1.587 | | |
| 18* | −16.355 | 0.5 | 1.68893 | 31.16 |
| 19 | 7.476 | 3.082 | 1.7725 | 49.62 |
| 20 | −11.619 | Variable (D3) | | |
| 21* | 14.863 | 1.969 | 1.76802 | 49.24 |
| 22* | 61.105 | Variable (D4) | | |
| 23 | Infinity | 0.3 | 1.5168 | 64.2 |
| 24 | Infinity | 0.3 | | |
| 25 | Infinity | 0.5 | 1.5168 | 64.2 |
| 26 | Infinity | Variable (D5) | | |
| image forming surface | Infinity | Variable (D6) | | |

In Table 9, a mark of "*" which is added behind some of the surface numbers means that the surface corresponding to the surface number is aspheric. Table 10 provides data relating with the above described aspheric.

TABLE 10

| Surface number | K | A | B | C | D |
|---|---|---|---|---|---|
| 6 | −1 | −4.52525E−5 | 5.96263E−7 | −2.30928E−9 | |
| 7 | −0.10502 | −1.46357E−4 | −1.25007E−6 | −1.67045E−8 | |
| 10 | 2.471897 | −4.37211E−5 | −6.70966E−7 | | |
| 11 | −6.786082 | 3.89366E−5 | −2.44744E−7 | −2.48172E−10 | |
| 12 | 0.076679 | −9.53517E−5 | −6.67267E−8 | 9.79790E−10 | |
| 13 | −8.815789 | 9.83393E−5 | −5.82248E−8 | 7.71013E−9 | −8.12547E−11 |
| 18 | 1.836704 | −2.54891E−4 | −5.61359E−6 | −1.21722E−7 | |
| 21 | −5.491268 | 2.59653E−4 | −8.41046E−7 | | |
| 22 | −1 | −9.26495E−5 | −4.21537E−7 | | |

Table 11 provides data of surface intervals which are changed corresponding to the zooming operation of the zoom lens optical system 1'.

TABLE 11

| | Wide-angle end | Middle position | Telephoto end |
|---|---|---|---|
| D1 | 0.907 | 4.98 | 9.433 |
| D2 | 14.802 | 5.766 | 0.842 |
| D3 | 3.331 | 5.532 | 9.695 |
| D4 | 2.748 | 3.37 | 2.517 |
| D5 | 0.6 | 0.6 | 0.6 |
| D6 | −0.006 | 0.007 | 0.037 |

Table 12 provides an effective focal length EFL, an F number and an angle of view ω of the zoom lens optical system 1' according to this embodiment in each of zooming positions.

TABLE 12

|  | EFL | F number | ω/2 |
|---|---|---|---|
| Wide-angle end | 6.19 | 1.2 | 36.88 |
| Middle position | 10.53 | 1.8 | 24.11 |
| Telephoto end | 17.66 | 2.3 | 14.61 |

In this embodiment, numerical values corresponding to Formulas 1, 2 and 3 are as follows.

$|(f_t/f_w)/f_2|$: 0.29

$(L_w/f_w)+(L_t/f_t)$: 11.86

Vd: 70.44

Therefore, this embodiment satisfies all of Formulas 1, 2 and 3.

As shown in Table 12, when F number is 1.2 at the wide angle end, the zoom lens optical system 1' can have a large diameter. Also, since the aperture 35 is disposed within the third lens unit 30, the size of the aperture 35 can be minimized and the shutter speed can be prevented from being reduced due to increasing of the diameter of the lens optical system 1'.

Figure 6A:
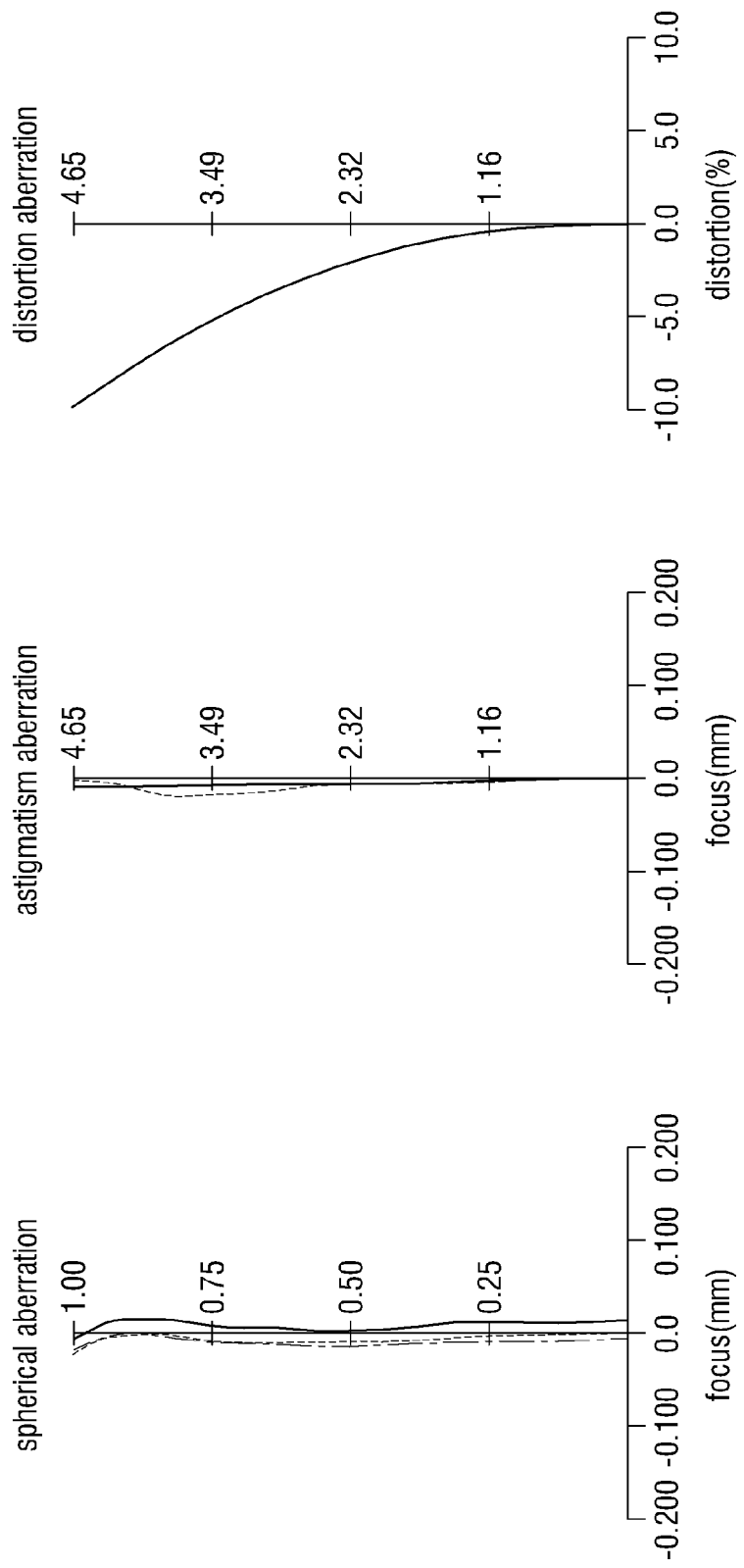
Figure 6C:
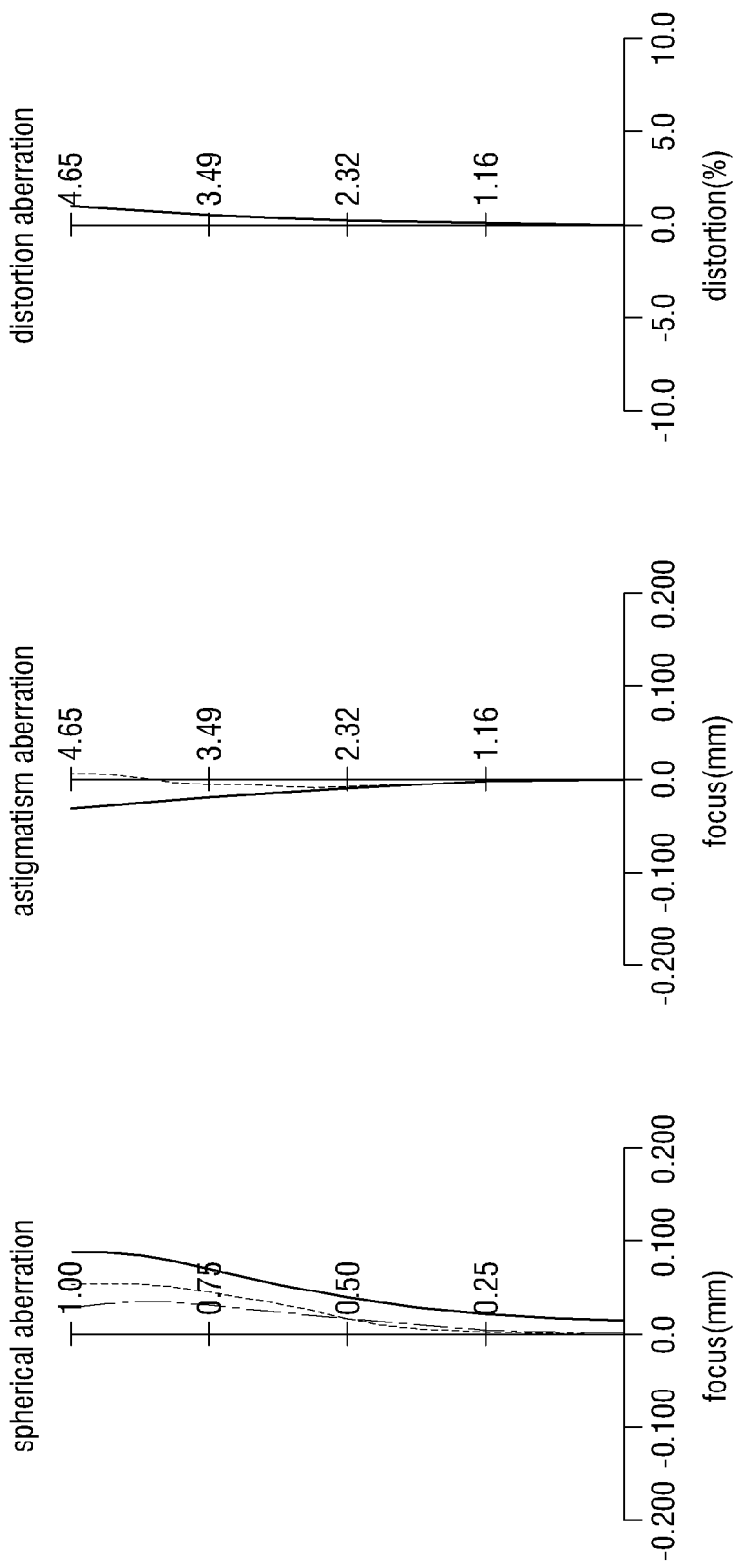

FIGS. 6A, 6B, and 6C are graphs which show aberration characteristics of the zoom lens optical system 1' according to this embodiment. FIG. 6A shows the aberration characteristics thereof at the wide-angle end. FIG. 6B shows the aberration characteristics thereof at the middle position. FIG. 6C shows the aberration characteristics thereof at the telephoto end. In the graphs showing spherical aberration, a solid line represents a light having a wavelength of 656.28 nm, a dotted line represents a light having a wavelength of 587.56 nm, and a dashed-dotted line represents a light having a wavelength of 486.13 nm. In the graphs showing astigmatism aberration, a solid line represents aberration in a tangential direction, and a dotted line represents aberration in a sagittal direction. As shown in FIGS. 6A, 6B, and 6C, all of the spherical aberration, astigmatism aberration, and distortion aberration are within an acceptable range.

Figure 7:
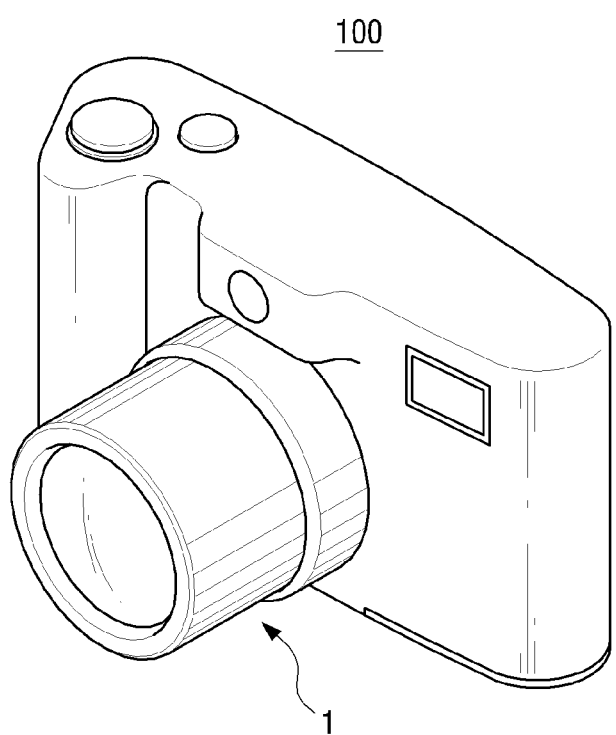
FIG. 7 is a perspective view schematically illustrating an image pickup apparatus having the zoom lens optical system illustrated in FIG. 1.

FIG. 7 is a perspective view schematically illustrating an image pickup apparatus 100 to which the zoom lens optical system 1 and 1' according to an embodiment of the present disclosure is applied. The image pickup apparatus 100 as illustrated in FIG. 7 is a digital still camera. However, the zoom lens optical system 1 and 1' according to an embodiment of the present general inventive concept may be applied to various image pickup apparatuses that can photograph an object such as a video camera, a surveillance camera, and the like. Since the zoom lens optical system 1 and 1' can be miniaturized and lightweight, a more compact and lighter image pickup apparatus 100 can be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A zoom lens optical system comprising:
a first lens unit having a positive refractive index;
a second lens unit which is arranged behind the first lens unit and has a negative refractive index;
a third lens unit which is arranged behind the second lens unit and has a positive refractive index; and
a fourth lens unit which is arranged behind the third lens unit and has a positive refractive index,
wherein an aperture is arranged at a location where a principal ray has a minimum height from an optical axis within the third lens unit.

2. The zoom lens optical system of claim 1, wherein the third lens unit comprises:
a first lens having a positive refractive index;
a first doublet lens which is disposed between the first lens and the aperture and is formed by junction of a second lens having a positive refractive index and a third lens having a negative refractive index; and
a second doublet lens which is disposed behind the aperture and is formed by junction of a fourth lens having a negative refractive index and a fifth lens having a positive refractive index.

3. The zoom lens optical system of claim 2, wherein the first lens comprises an aspherical lens.

4. The zoom lens optical system of claim 2, wherein an object-side lens surface of the fourth lens is aspheric.

5. The zoom lens optical system of claim 1, wherein the aperture moves with the third lens unit during zooming operation of the zoom lens optical system.

6. The zoom lens optical system of claim 1, wherein
a focal length $f_t$ of the zoom lens optical system at a telephoto end, a focal length $f_w$ of the zoom lens optical system at a wide-angle end, and a focal length $f_2$ of the second lens unit satisfy a formula $$0.23 < \left|\frac{f_t/f_w}{f_2}\right| < 0.35.$$

7. The zoom lens optical system of claim 1, wherein a distance $L_w$ between a first object side lens surface of the first lens unit and an image forming surface at a wide-angle end, a distance $L_t$ between the first object side lens surface of the first lens unit and the image forming surface at a telephoto end, a focal length $f_w$ of the zoom lens optical system at the wide-angle end, and a focal length $f_t$ of the zoom lens optical system at the telephoto end satisfy a formula $$11.5<(L_w/f_w)+(L_t/f_t)<13.5.$$

8. The zoom lens optical system of claim 1, wherein Abbe's number $(V_d)$ of at least one lens of the second lens unit satisfies a formula of $70 \leq V_d$.

9. The zoom lens optical system of claim 1, wherein while a focal length of the zoom lens optical system changes according to a zooming operation changing from a wide-angle end to a telephoto end, the first, second, third, and fourth lens units move along the optical axis so that an interval between the first lens unit and the second lens unit is increased, an interval between the second lens unit and the third lens unit is decreased, and an interval between the third lens unit and the fourth lens unit is increased.

10. The zoom lens optical system of claim 1, wherein the first lens unit comprises a first doublet lens formed by junction of a first lens having a negative refractive index and a second lens having a positive refractive index.

11. The zoom lens optical system of claim 10, wherein the first lens unit further comprises a third lens which is arranged behind the first doublet lens and has a positive refractive index.

12. The zoom lens optical system of claim 1, wherein the second lens unit comprises;
a first lens of meniscus having a negative refractive index;
a second lens which is arranged behind the first lens, has a negative refractive index, and is a biconcave lens; and a third lens which is arranged behind the second lens, has a negative refractive index and is a meniscus lens.

13. The zoom lens optical system of claim 12, wherein at least one lens among the first, second and third lenses comprises an aspherical lens.

14. The zoom lens optical system of claim 1, wherein the fourth lens unit comprises a first lens having a positive refractive index.

15. The zoom lens optical system of claim 14, wherein the first lens comprises an aspherical lens.

16. The zoom lens optical system of claim 1, wherein an F number of the zoom lens optical system is 1.2 at a wide-angle end.

17. An image pickup apparatus comprising:
a zoom lens optical system comprising:
   a first lens unit having a positive refractive index;
   a second lens unit which is arranged behind the first lens unit and has a negative refractive index;
   a third lens unit which is arranged behind the second lens unit and has a positive refractive index; and
   a fourth lens unit which is arranged behind the third lens unit and has a positive refractive index,
wherein an aperture is arranged at a location where a principal ray has a minimum height from an optical axis within the third lens unit.

* * * * *